United States Patent [19]

Borcher et al.

[11] 3,993,722

[45] Nov. 23, 1976

[54] PROCESS FOR MAKING VARIEGATED SOAP BARS OR CAKES

[75] Inventors: Thomas A. Borcher, Elsmere, Ky.; John R. Knochel, Blue Ash, Ohio

[73] Assignee: The Procter & Gamble Company, Cincinnati, Ohio

[22] Filed: Jan. 31, 1975

[21] Appl. No.: 546,053

[52] U.S. Cl. .................................. 264/75; 252/367; 264/102; 264/148; 264/320; 425/131.1

[51] Int. Cl.² ............................................ B29F 3/12

[58] Field of Search ............. 264/101, 102, 75, 148, 264/320, 349, 211, 143; 252/367–371; 425/131.1

[56] References Cited

UNITED STATES PATENTS

| | | | |
|---|---|---|---|
| 1,083,275 | 1/1914 | Eberhard | 264/75 |
| 2,142,983 | 1/1939 | Thurman | 252/371 |
| 2,185,653 | 1/1940 | Thurman | 252/371 |
| 3,485,905 | 12/1969 | Compa et al. | 264/102 |
| 3,673,294 | 6/1972 | Matthaei | 264/75 |
| 3,940,220 | 2/1976 | D'Arcangeli | 425/131.1 |

FOREIGN PATENTS OR APPLICATIONS

| | | | |
|---|---|---|---|
| 584,141 | 10/1958 | Italy | 264/75 |

*Primary Examiner*—Jeffery R. Thurlow
*Attorney, Agent, or Firm*—George W. Allen; Ronald L. Hemingway; Richard C. Witte

[57] ABSTRACT

A process for making variegated soap bars or cakes. Such bars are prepared by co-plodding differently colored commingled sets of soap noodles having particular diameters wherein at least one set of the soap noodles have diameters of about ⅛ inch or less.

9 Claims, 3 Drawing Figures

PROCESS FOR MAKING VARIEGATED SOAP BARS OR CAKES

BACKGROUND OF THE INVENTION

This invention relates to the preparation of consistently variegated soap bars or cakes with well-defined variegation patterns. More particularly, this invention relates to a process and an apparatus that utilize commingling of soap noodles of particular diameters in order to achieve variegated bars or cakes of uniform quality.

Variegated soap bars or cakes containing colored patterns (e.g., marbleization, striation or mottling) have been manufactured for many years. Moreover, processes employing at least two differently colored sets of soap noodles (i.e., each set of noodles being of different color) to achieve such variegation are known.

U.S. Pat. No. 3,673,294 issued June 27, 1972 to R. G. Matthaei, and entitled "Method for Manufacture of Marbelized Soap Bars," discloses a process which employs a first and second preplodder to prepare differently colored soap noodles of from 3.16 inch to 3 inches in diameter which are then coplodded in a final plodder.

Italian Industrial Patent 584,141 granted Oct. 23, 1958 to Mazzoni also discloses a two-color noodle process in which differently colored noodles of unspecified size are gravity fed into a final worm plodder.

British Patent Specification 1,370,670, published Oct. 16, 1974 in the name of the Colgate-Palmolive Company and entitled "Method and Apparatus for the Manufacture of Variegated Soap Bars" discloses a two noodle variegating process utilizing noodles of exceedingly small diameters to produce a marbled bar.

Other efforts in achieving a variegated soap bar with two noodle methods include those disclosed in U.S. Pat. No. 3,769,225 issued Oct. 30, 1973 to R. G. Matthaei and entitled "Process for Producing Marbleized Soap" which uses dye to color portions of soap noodles or chips on a moving bed prior to plodding; U.S. Pat. No. 3,823,215 issued July 9, 1974 to A. D'Arcangeli and entitled "Process for Producing Variegated Detergent Bars" which discloses a variegating head compacting differently colored extruded soap noodles; and Austrian Patent 95947 issued Feb. 11, 1924 to O. Bauer and entitled "Process and Apparatus for the Preparation of Marbles Soap" which briefly sketches a two noodle soap bar marbleizing process.

While some of these methods may have provided bars on a commercial scale, there is a continuing need for variegated bar processing improvements. More particularly, there is a continuing need for processes and apparatus suitable for commercial production of bars which have little or no undesirable color smearing. There is further need for a process and apparatus which can be used to produce variegated soap bars which consistently possess a desired uniformly distinctive variegated pattern.

Accordingly, it is an object of the instant invention to provide a process and an apparatus for making variegated soap bars or cakes.

It is a further object of the instant invention to provide a process and apparatus for making variegated bars or cakes of substantially uniform appearance at commercially acceptable production rates.

It is a further object of the instant invention to provide a process and apparatus for consistently making variegated soap bars or cakes with little or no undesirable color smearing at commercially acceptable production rates.

It has been surprisingly discovered that by exercising noodle diameter control and by utilizing noodle commingling prior to final plodding, a two color noodle process can be realized which achieves the above-described objectives and which produces variegated soap bars in a manner not suggested by the prior art.

SUMMARY OF THE INVENTION

In its process aspect, the instant invention involves the steps of a) providing at least two differently colored soap masses, b) plodding and extruding these soap masses to form separate streams of soap noodles of a particular size, c) introducing these soap noodle streams into a vacuum chamber, d) commingling these noodle streams within the vacuum chamber, e) finally plodding the commingled noodles into a variegated soap log and g) forming the soap log into soap bars or cakes. At least one set of the soap noodles formed by preplodding comprises small diameter soap noodles having diameters of about ⅛ inch or less. At least one of the other sets of soap noodles formed by preplodding comprises larger diameter soap noodles having diameters at least about twice as large as those of the small diameter noodles.

In its apparatus aspect, the invention herein involves, in its preferred embodiment, the elements of a) a first means for extruding a soap mass of one color to form a stream of small diameter soap noodles, b) a second means for extruding a differently colored soap mass to form a stream of larger diameter soap noodles, c) a vacuum chamber communicating with the first and second extruding means, d) means for directing together the streams of small and large diameter noodles to achieve commingling of these noodle streams within the vaccum chamber, e) a means further communicating with the vacuum chamber for final plodding of the commingled noodles into a variegated soap log, and f) a means for forming the log into variegated bars or cakes. The first extruding means produces noodles having diameters of about ⅛ inch or less. The second extruding means produces larger soap noodles having diameters at least about twice the size of those of the small diameter noodles.

DETAILED DESCRIPTION OF THE INVENTION

Figures 1, 2, 3:
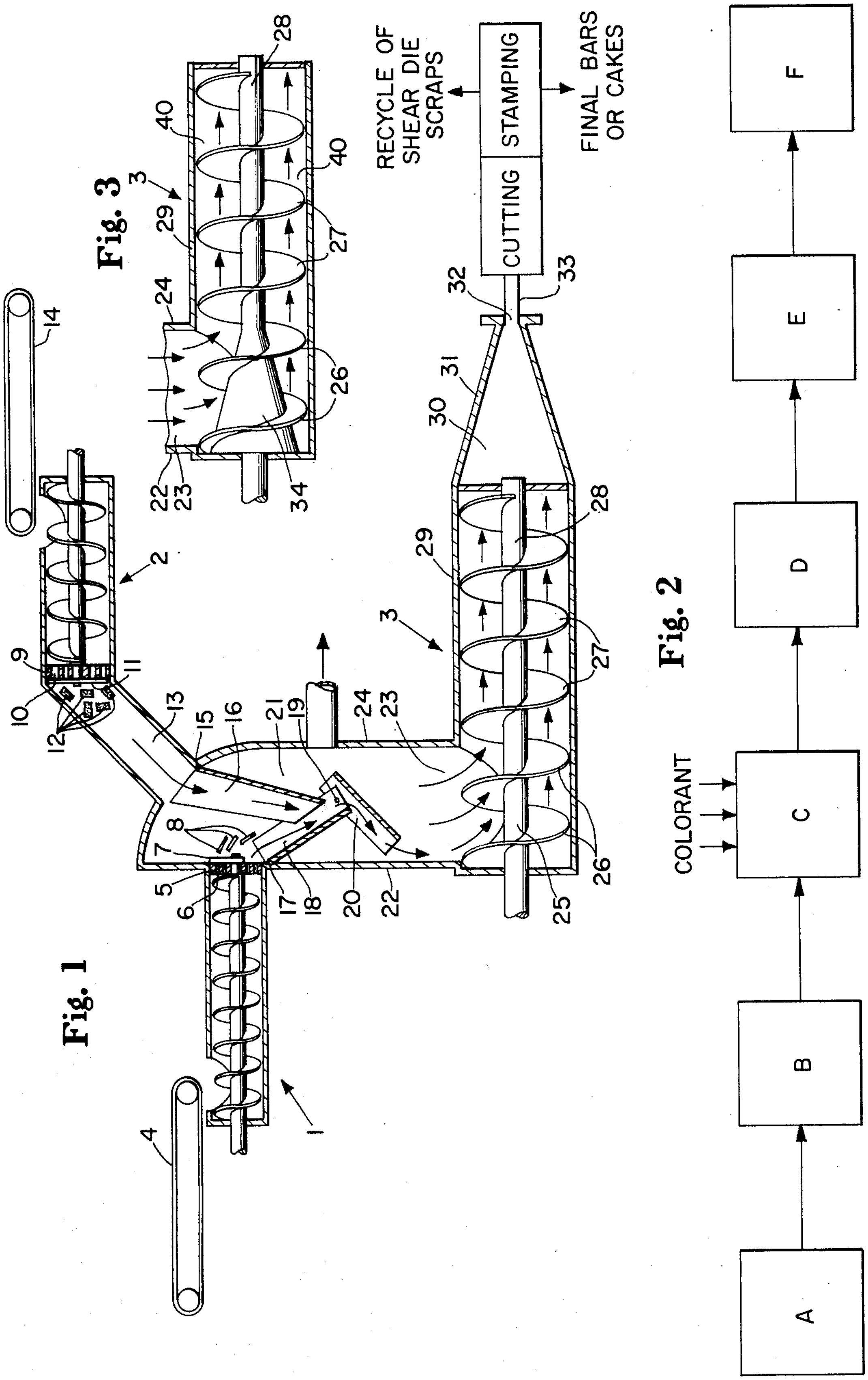
FIG. 1 illustrates, with a partial sectional view a partial schematic view, the process and apparatus of the invention herein and includes two preplodders each with a foraminous, soap noodle-forming plate; a final plodder; a vacuum chamber communicating between the preplodders and the final plodder; chutes within the vacuum chamber used to direct noodle streams from the preplodder and a schematic diagram relating to the cutting of the soap log and stamping of the soap bars or cakes.
FIG. 2 is a block diagram showing stages for a preferred continuous recycle preparation of a colored soap mass. This diagram represents, in series, a preplodder, a feed control conveyor, a mixer for admixing colorant, a colored soap mass receiver/feed control conveyor, a colored noodle plodder, and a feed control conveyor.
FIG. 3 is a sectional view of an alternative, tapered worm shaft final plodder which can be employed in the invention.

FIG. 1 illustrates preplodders 1 and 2, and final plodder 3 in combination with vacuum chamber 21 having chutes or baffles 16, 18 and 20 inside. A first color soap mass in the form of pellets, billets, flakes, chips, filaments, chunks, shavings or other suitable preplodding form passes from rate control adjuster 4 where it is preplodded in preplodder 1. Preplodder 1 compacts this soap mass of a single color and extrudes it through a forminous plate 5. Plate 5 has a set of holes or perforations 6 through which the soap mass is forced. The extruded soap can then be cut by rotating knife edge 7 into noodles, represented by 8, which form a noodle stream. The noodle stream formed falls into chute 18, which can be adjustably mounted in the vacuum chamber.

Foraminous plate 5 is normally about 1 to 3 inches thick and usually has a diameter of from about 6 to about 16 inches, preferably 10 to 16 inches. The holes or perforations 6 in the foraminous plate can be optionally back drilled to provide a wetted length, i.e., the final length of the hole through which the noodle passes as it exits out of the plate, of from about 1/16 inch to about 1 inch. This back drilling reduced the pressure necessary to extrude the soap mass out of the foraminous plate, thereby reducing the load on the preplodder motor. Plate 5 can be drilled or cut such that holes 6 therein have diameters of from about 1/32 inch or less to about ⅛ inch, preferably from about 1/16 inch to about ⅛ inch.

Simultaneous to the noodle stream formation by preplodder 1, a colored soap mass of a different color from that processed in preplodder 1, passes from rate control adjuster 14 and is introduced into and plodded in preplodder 2. Preplodder 2 compacts this differently colored soap mass and extrudes it through foraminous plate 9, which can be of similar dimensions to plate 5 with the exception of hole diameter size. Plate 9 has a set of holes or perforations 10, which for any given run are different in size from holes 6 in foraminous plate 5. Holes 10 and plate 9 can vary in diameter but plate 9 must contain holes which are at least about twice the diameter of holes 6. Preferably the holes 10 in plate 9 vary in diameter between ¼ inch to about 1 inch.

The soap mass extruded through the set of holes 10 in plate 9 is cut by a rotating knife edge 11 into noodles 12 of desired lengths to form a second noodle stream. As in the drawing, the noodle stream so formed can fall into chute 13 and enter the vacuum chamber 21 and chute 16. Alternatively, however, chute 13 can be eliminated by adjusting the relative elevation of preplodders 1 and 2 such that both noodle streams fall directly into the vacuum chamber.

Foraminous plates 5 and 9 are normally drilled or cut so as to contain from about 10 to about 1600 holes or perforations, depending upon, for instance, hole diameters and plate diameters. Such holes or perforations normally provide about 5% to about 50% open area in the plates. Although circular holes are preferred, other shaped holes can be employed, e.g., rectangular, oblong or star shaped holes. In the case of non-circular holes, diameter refers to the largest cross-sectional dimension. Normally, the holes in each individual plate are of about the same diameter.

Noodle streams formed by noodles 8 and 12, and which have been extruded from plates 5 and 9 respectively, cascade simultaneously into vacuum chamber 21. These streams of noodles are directed together to achieve commingling of the differently colored noodles. This commingling can be accomplished by particular positioning of the preplodders and the vacuum chamber or, preferably, as shown in FIG. 1, by means of chutes mounted in the vacuum chamber. However accomplished, it is essential to the obtention of controllably variegated bars or cakes that the noodle streams be directed together within the vacuum chamber to achieve commingling of the differently colored noodles before the noodles reach the bottom region 23 of the vacuum chamber 21. Chutes 16 and 18 are preferably employed to direct together the streams of noodles leaving preplodders 1 and 2. These chutes thus achieve commingling of the differently colored noodles by means of intersection of the noodle streams within the vacuum chamber. Chutes 16 and 18 can be adjustably mounted to vacuum chamber 21 at hinges 15 and 17 respectively, thereby permitting adjustment for particular noodle flow rates and, moreover, for desired variegation of the final bars or cakes.

Particularly advantageous commingling of the noodles of different color can be achieved if chute 16 and 18 form the separate streams of noodles into a substantially confluent noodle stream within vacuum chamber 21. Utilization of a confluent noodle stream to achieve noodle commingling has been found to permit realization of a high degree of variegation control and consistency of the final bars or cakes.

Within the vacuum chamber, a chute 20 can be used to channel the commingles noodles into a commingles or mixed noodle bed at the bottom region 23 of the vacuum chamber. Chute 20 can be adjustably mounted at hinge 19 to chure 18 to channel the commingled noodle stream in any desired direction. It has been found that direction by chute 20 of a commingled noodle stream to the back side 22 of vacuum chamber 21 promotes the desired "mass flow" of commingled noodles through the vacuum chamber with little undesirable segregation of the differently colored noodles.

The commingled noodles pass from the bottom region 23 of the vacuum chamber into final plodder 3. In continuous operation, choke feeding of the commingled noodles into final plodder 3 is preferred. Allowing the commingled noodles to accumulate at the bottom region 23 (between walls 22 and 24) of vacuum chamber 21 provides the aforementioned choke feeding of noodles into the final plodder 3. Noodle bed formation, e.g. choke feeding, lessens noodle segregation as compared to starve feeding of noodles into the final plodder. Preferably then, the noodles form a substantially level noodle bed at least about 1 inch deep in the bottom region 23 of the vacuum chamber.

The commingled soap noodles from the bed are introduced into, then compacted along final plodder 3 containing a worm inside plodder housing 29. The worm comprises a rotatable shaft 28, having representative flights 26 and 27. A portion of the worm shaft 25 is shown as straight in FIG. 1 but alternatively this portion can be tapered as is shown in FIG. 3, discussed hereinafter. Worm flights within the vacuum chamber can have a pitch at any angle but are preferably vertical in pitch as in FIG. 1.

Worm shaft 28 can be free within plodder housing 29 or can ride on a conventional "spider" support to reduce the wear which can occur of the free riding worm flights rub against housing 29. Preferably, however, shaft 28 is free within housing 29 inasmuch as the spider support effects certain soap flow characteristics which can cause uneven variegation within the soap mass as it passes through the plodder nose cone.

With either the straight worm as in FIG. 1 or the tapered worm as in FIG. 3, the final plodder 3 is used to compact the commingled noodles into a variegated soap mass 30 within the final plodder nose cone 31. The variegated soap mass is extruded through final plodder nozzle 32 to form a variegated soap log 33 which is cut into variegated soap billets.

Billets cut from the soap log can be stamped into variegated bars or cakes in conventional fashion. Excess variegated soap from the stamping operation, i.e., shear die scraps, can be recycled to form colored noodles.

FIG. 2 is a block diagram of a colored noodle recycle procedure employed in a preferred operation of the present process. Block A is a preplodder used to preplod shear die scraps from bar stamping operations. From the preplodder A, the plodded scraps are monitored along a suitable feed control device B to insure proper feed amounts passing into colorant adding and mixing device C. This colorant adding and mixing device can be generally an open mixer wherein colorant is mixed into the preplodded shear die scraps to provide a homogeneously colored soap mass. This mixing device C can also comprise another preplodder for optimum soap compaction. A variety of soap additives or adjuvants along with colorant can be added at this stage in minor amounts to provide aesthetic or functional attributes other than color to the noodles. The colorant added is normally a dye/water mixture with a dye concentration varying from about 0.1% to 10% by weight.

From the mixer C, the soap mass passes to a feed control device D which receives the colored soap mass and insures that desired amounts of colored soap are passed to preplodder E.

From preplodder E, the soap mass is monitored by suitable feed control F which can correspond either to rate adjuster 4 or 14 of FIG. 1 or to a rate adjuster for an optional alternative third color noodle preplodder. This recycle procedure insures that the colored soap particles exiting from feed control device F are substantially compact. If the colored noodles are not compact enough to withstand the additional work applied to them during passage through the vacuum chamber, they can become particleized. Particleization results in a less controllable process and, ultimately variegated bars or cakes which have color smearing and/or inconsistent patterns.

FIG. 3 is illustrative of an alternative embodiment for the final plodder 3. This alternative embodiment facilitates the passage of noodles from the vacuum chamber 21 to and through the final plodder 3. As seen in FIG. 3, the alternative final plodder 3 has a tapered worm shaft 34 with a representative set of flights 26 and a second set of flights 27. Due to the worm shaft taper, the volume between the flights 26, beginning at the back wall 22 of the vacuum chamber and extending to the front wall 24 of the vacuum chamber, is less than the volume between flights 27 farther along the worm toward the end of the plodder housing 29. Thus, as can be seen, the volume of noodles permitted to enter between flight set 26 is less than the volume of noodles compacted in the volume between flight set 27.

Tapering can be achieved by forming sheet metal around the portion 25 (FIG. 1) of the worm shaft extending between vacuum chamber walls 22 and 24 to form tapered shaft 34. The degree at which the worm shaft can be advantageously tapered comprises a conical angle varying from about 10° to about 30°.

Especially at high rotation rates of the worm in final plodder 3, tapering provides at least two benefits. First, tapering has been found to reduce reverse soap flow caused by the squeezing of soap between the top of the worm flights and inside wall 40 of the final plodder housing 29. This reverse flow, moving in the direction opposite to the general flow of the soap through plodder 3, can cause undesirable smearing of variegation in the extruded soap log.

Secondly, and more importantly, tapering permits introduction of the commingled noodles into plodder 3 in such a way as to provide substantial mass flow of noodles through the vacuum chamber. It is particularly desirable that all noodles have about the same residence time in the vacuum chamber. Otherwise, excess work can be applied to some of the noodles causing breakage and disintegration. Such breakage and disintegration of individual noodles can substantially reduce the variegation consistency of the final bars. Breakage and disintegration can occur primarily at the point where the worm shaft 34 is nearest the intersection of vacuum chamber wall 24 and plodder housing 29.

Optimum mass flow with the tapered worm shaft embodiment can be achieved by using chute 20 (FIG. 1) to funnel substantially all the noodles toward the back side 22 of the vacuum chamber. In this way, the depth of the mixed bed (from which noodles are being choke fed into the final plodder) is highest near vacuum chamber back wall 22 and is lowest near vacuum chamber front wall 24. Consequently, any troublesome flow back or regurgitation of noodles from plodder 3 near vacuum chamber front wall 24 is minimized. This is so since any noodles near front wall 24 can be readily taken into plodder 3 because of the large volume between flights available for noodle ingestion and further because only relatively small amounts of noodles are available at that point.

Soap Mass Composition

Variegated soap bars or cakes are, of course, fashioned from a base soap mass. For purposes of this invention, the term soap mass refers to any conventional combination of detersive surfactant materials, including true soap and other soap bar or cake adjuvants, that can be plodded into a final soap bar or cake. Such soap mass can be made from a variety of well-known detersive surfactant compounds including anionic, nonionic, cationic, amphoteric and ampholytic surfactants and compatible combinations thereof. Typical of such surfactants are the organic detergents listed at columns 8, 9 and 10, lines 27–75 and 1–75 and 1–52, respectively, of U.S. Pat. No. 3,714,151 issued Jan. 30, 1973 to W. I. Lyness and herein incorporated by reference. Particular soap mass compositions capable of being plodded are well-known in the art.

Preferred soap mass compositions are prepared from water-soluble soaps including sodium, potassium, ammonium and alkanol-ammonium (e.g., mono-,di-, triethanolammonium) salts of higher fatty acids (e.g. $C_{10}$–$C_{24}$) as a major component. Particularly useful are the fatty acids derived from coconut oil and tallow, i.e., sodium and potassium tallow, and coconut soaps.

The soap mass can be prepared through conventional milling and optional plodding steps well known in the art. The soap mass begins typically as a kettle soap which is dried and then mixed with desired adjuvants as perfume, fillers, emollients, water, salt, etc., and is thereafter milled into chips, ribbons, pellets, noodles or other suitable preplodding mass form. Preferred major soap mass constituents herein are tallow and coconut soaps at weight ratios of tallow to coconut soap ranging from 95:5 to 5:95. Particularly preferred soap masses are those which comprise from about 40% to 90% by weight tallow soap and/or those which comprise about 10% to 60% coconut soaps.

The soap mass components further can contain the usual additives or adjuvants. Such additives include free fatty acid, perfumes, bacteriostats, sanitizers, whiteners, abrasives, emollients, etc., along with usual moisture content of from about 8% to 14% water, and salt content of from about 0.1% to about 2% sodium chloride and the like.

Noodle Size Control

Variegation control to realize soap bars or cakes of varying appearance can be achieved according to the invention herein by adjustment of various factors including processing speeds, contrast of noodle colors, and, in particular, noodle size selection. For example, higher processing rates generally produce bars of more striated appearance whereas, at equal processing rates, colored noodles of increasing diameters produce a bar having more of a "marbeleized" character. However, the greatest degree of control of the appearance of the bars or cakes produced herein is obtained by utilizing soap noodles of particular sizes.

More particularly, to form bars in accordance with the instant invention, a soap mass of one color must be extruded to form a stream of small diameter noodles which have noodle diameters of about ⅛ inch or less. These small diameter noodles can have diameters as low as 1/32 inch or less but at noodle diameters below about 1/16 inch conventional plodding equipment cannot be as effectively employed as with noodle diameters of about ⅛ inch.

The relatively small diameter noodles of about ⅛ inch or less are mixed with and distributed among the larger diameter noodles of a different color with a surprisingly high degree of efficiency. In particular, small diameter noodles of about ⅛ inch or less in diameter, appearing as spaghetti-like strands within the vacuum chamber, serve to "capture" larger noodles of different color and diameter and prevent segregation of the two colors of noodles before final plodding. Such capturing to prevent segregation of noodles is a particularly important factor in controlling variegation and in realizing bars or cakes of uniform appearance.

Besides the advantageous capturing effect, a further advantage of employment of small diameter noodles is the ability to make these noodles substantially less friable than comparably extruded larger diameter noodles. That is, the relatively small diameter holes, through which these small diameter noodles extrude, provide advantageous compaction of noodle material. Consequently, the ability of the smaller diameter noodles to capture the larger diameter noodles, particularly when the smaller diameter noodles are predominant by weight, is enhanced in that the noodles have a greater tendency to bend and surround the larger diameter noodles rather than breaking or cracking due to their relatively long length and small diameters.

In order to most effectively achieve larger noodle capture a substantial commingling of the streams of noodles of different diameters and colors must occur. Thus, especially if chutes or baffles are employed, the noodles are mixed to become a conglomerate-like mass which substantially reduces the freedom of movement of individual noodles as they cascade through the vacuum chamber. Such restricted movement of individual noodles serves not only to reduce noodle segregation during passage through the vacuum chamber, but, furthermore, can serve to minimize the tendency of the noodles to crack and disintegrate in the vacuum chamber.

To prevent undesirable color smearing, the larger diameter noodles should be at least about twice the diameter size of the smaller noodles. That is, noodles of especially dark contrasting colors, or which contain relatively high amounts of colorant should be at least about twice and can be up to 16 times, the diameter of the small diameter noodles. Preferably, these differently colored larger noodles have diameters of from about 4 to about 8 times the diameter of the smaller diameter noodles. Preferred diameters of the larger diameter noodles generally vary from about ¼ inch to about 1 inch.

Bars of especially desirable appearance can be made when the color of the small diameter noodles is the predominant color in the final bar or cake. This is, of course, achieved by introducing more of the small noodles (on a weight basis) into the vacuum chamber. Thus, preferably, small diameter noodles are introduced into the vacuum chamber at a weight rate of about 2 to about 6 times, preferably about 3 to 5 times, the weight rate of the larger diameter noodles. More preferably, these small diameter noodles, which are used in larger amounts by weight, are white with the larger diameter noodles being of contrasting color.

The length of the small diameter noodles can be an important factor in achieving the capture of the larger diameter noodles within the vacuum chamber. Particularly efficient capturing is obtained when the small diameter noodle lengths range from about 2 inches to about 5 inches, preferably from about 3 to 5 inches. Even longer lengths of noodles can be employed with some types of soap mass compositions but with other types of soap mass compositions noodles have a tendency to break within the vacuum chamber, thereby decreasing the consistency of variegation of the final bars.

The larger diameter noodles can also be of varying lengths, but especially desirable bars have been made with large diameter noodle lengths of about ¼ inch to about 5 inches. Such a range of larger diameter noodle lengths permits selection of a variety of variegation types including highly striated bars or bars of a more mottled or marbleized appearance.

It is preferred that all of the smaller diameter noodles should be of substantially equal lengths and all of the larger diameter noodles should be of substantially equal lengths, but all of the noodles, e.g. small and larger diameter noodles, need not have the same lengths.

Process Conditions

Process conditions throughout the various stages in the instant process are generally within conventional limits.

Preplodding

The soap masses entering the preplodder normally have and are maintained at temperatures of from about 75° F to about 105° F. In extruding the small diameter noodles, however, it is preferred that the preplodder have suitable coolant to keep the preplodder barrel temperature between about 85° F to about 105° F to maintain plodding efficiency and noodle temperature control. Both the small and larger noodles entering the vacuum chamber after extrusion generally have temperatures of about 85° F to about 105° F, preferably 90° F to 100° F. Noodle sets are generally kept within a temperature different of about 10° F from each other to prevent undesirable or improper fusing of the noodles during final plodding.

Vacuum Chamber

The vacuum chamber pressure is normally kept at from about 25 to 29 inches of mercury with about 27 inches of mercury being preferred. Any conventional evacuating device can be employed to remove air from the chamber. Without air removal, improper fusing of the soap noodles can result.

Final Plodding and Extruding

The moisture content differential between individual or sets of noodles should be maintained within about 3% by weight, and preferably less. This prevents improper fusing and smearing of the noodles in the final plodder. If colored noodles are made by the recycle method, it is important that the recycled noodles have moisture contents of about 8% to 14% by weight, more preferably about 8% to about 12%.

The soap log extruded from the final plodder is preferably kept between 85° F and 105° F by means of a cooling jacket surrounding the final plodder housing. If the compacted noodle mass temperature at this stage is allowed to rise above about 110° F, then undesirable smearing of the variegated pattern can occur. In usual operation, the soap log extrudes from the nozzle at pressures of about 100 to about 350 lbs/sq. in., preferably at 150–250 psi. At higher pressures, smearing of colors can occur.

By employing the above-described processing conditions, aesthetically pleasing bars can be achieved with controllable consistency. Moreover, such process conditions permit preparation of finally extruded soap logs which need not undergo optional "skimming" of their outer edges. Such skimming, while normally coincident with other methods of preparation of variegated bars, can advantageously be omitted from the process herein.

Diagonal Stamping/Curved Variegation

The instant invention preferably involves a stamping procedure to obtain bars or cakes with aesthetically pleasing curvature and/or diagonal orientation of the variegated pattern on and within the soap bars or cakes. Curvature of variegated patterns can be accomplished by using a stamping procedure involving a die box cavity which is larger than the soap billet being compressed therein. When the die box cavity is larger in height or length than the soap billet being processed, stamping compression squeezes soap into the cavity voids, thereby causing curvature of the variegated pattern.

Diagonal stamping of the variegated billets, i.e., stamping to provide bars with colored indicia having a general direction diagonally disposed to the long axis of the bar or cake, has been found to provide variegated bars or cakes or especially pleasing appearance. Moreover, diagonal stamping is generally utilized concurrently with the foregoing large die box cavity procedure to provide bars or cakes with both curved and diagonal patterns A diagonal stamping/curved variegation method useful herein comprises aligning a cylindrical variegated soap billet with the die box cavity such that the long axis of the billet, i.e., the axis parallel or coincident with the long axis of the extruded soap log, is not coincident with the long axis of a rectangular die box cavity. The thus rotated or skewed billet can be positioned at any angle but is preferably aligned so that the billet axis is not greater than 45° askew from the long axis of the die box cavity. Further, the diameter (height) of the portion of the billet to be compressed is preferably less than the short axis of the die box cavity by a factor of about 5% to about 25% so as to effect curvature of the variegation pattern as described above. The length of the billet usually exceeds that of the die box cavity.

The billet so positioned is then stamped into the die box cavity such that the compression of the stamping forces a portion of the soap billet to conform to the die box cavity. The parts of the billet flowing the greatest distance during compression into the die box will normally contain the variegated pattern of greatest curvature.

A series of such die box cavities can be mounted to a rotatable cylinder in a fashion such that each die box cavity sequentially receives a billet on its diagonal, becomes a mold for compressing a portion of the billet into a bar or cake, and then releases the bar on to a conveyor, each stage occurring during rotation of the mounting cylinder.

Further detail and alternative ways of obtaining bars with curved variegated pattern can be found in U.S. Pat. No. 3,899,566, Murray, issued Aug. 12, 1975, herein incorporated by reference.

The following examples described with reference to the drawings illustrate the practice of the instant invention but are not considered limiting thereof.

EXAMPLE I

Blue Variegated Soap Bars

A soap mass in the form of white chunks having the following composition by weight is fed into preplodder 1.

| SOAP MASS COMPOSITION | | |
|---|---|---|
| Tallow and Coconut Sodium Soaps at 50% each by weight | | 78.5 % |
| Coconut Fatty Acid | | 7.0 % |
| Water | | 11.0 % |
| NaCl | | 1.1 % |
| Sanitizer | | .5 % |
| Perfume | | 1.6 % |
| Misc. and $TiO_2$ Whitener | Balance to | 100.00% |

A blue colored soap mass from a previous run is fed into preplodder 2. The blue soap mass has a composition similar to that of the white soap mass described above with a slightly higher moisture content of about 11.5%.

Both the white and blue soap masses have a temperature of about 90° F as they are fed into preplodders 1 and 2.

Preplodder 1 has a 10 inch in diameter foraminous plate 5 containing 1566 holes of about ⅛ inch in diameter through which the white soap mass extrudes to form noodles. Preplodder 1 is provided with a cooling jacket to maintain efficiency of the plodder and to keep the temperature of the extruding noodles at about 95° F.

Preplodder 2 has a 10 inch diameter foraminous plate 9 containing 400, 23, 36 and 60 holes for Runs A, B, C and D, respectively. Preplodder 2 is also jacketed for temperature control with noodles extruding therefrom having a temperature of about 90° E.

Noodle diameters, noodle lengths and noodle amounts for each of the blue and white soap masses are shown in Table I below.

The white and blue colored noodles extruded from preplodders 1 and 2 cascade into the vacuum chamber 21 and are commingled into a single noodle stream by chutes 16 and 18 respectively. The mixed noodle stream passes along chute 20 by which it is directed to the bottom region 23 of the vacuum chamber and into a noodle bed. From this bed, noodles are choke fed into final plodder 3. The vacuum chamber pressure is maintained at about 27 in./Hg.

A straight worm shaft in the final plodder is employed and the depth of the noddle bed above final plodder worm flights 26 varies from about 1 inch to about 6 inches. The mixed noodles from the bed are plodded through plodder 3 and extruded as a variegated soap log 33. The soap log extrudes out of nozzle 32 at about 200–250 psi.

Process parameters for Runs A–D employing the above-described procedure are provided in Table I.

TABLE I

| Run | White Noodle (Diameter/Length) | Blue Noodle (Diameter/Length) | Final Bar Rate (lb./min.) | Weight Ratio (White/Blue) |
|---|---|---|---|---|
| A | 1/8"/5" | 1/4"/1/4" | 30 | 3:1 |
| B | 1/8"/2" | 3/4"/5" | 50 | 4:1 |
| C | 1/8"/3" | 1"/2" | 70 | 4.5:1 |
| D | 1/8"/3" | 1/2"/1" | 65 | 3.5:1 |

All such runs provide soap logs of highly consistent appearance with well-defined variegation phases.

The logs are cut into cylindrical billets which are stamped into final bars. Rectangular die box cavities of length 3.7 inches and height 2.4 inches are employed to receive the billets. The billets are aligned with the die box cavities so that the cavities are at a diagonal to the longitudinal axis of the billet. The billet is slightly longer than the die box cavity and the diameter of the billet is slightly less (10%) than the short axis of the cavity. Stamping of the billets provides soap bars with aesthetically pleasing variegation patterns disposed diagonally to the longitudinal axis of the final soap bar.

EXAMPLE II

Using the method and soap compositions of Example I, bars are prepared using blue noodles with diameters of about ⅛ inch and white noodles with about ½ inch diameters. The blue and white noodles are each about 3 inches long. The white noodles are introduced into the vacuum chamber in an amount equal to 3.5 times the weight of the blue noodles. The commingled noodles are choke fed into final plodder 3 with a sloping noodle bed feeding plodder 3. Plodder 3 contains a tapered worm shaft 34 formed by placing a sheet metal cone around the portion 25 of the final plodder worm shaft extending between vacuum chamber walls 22 and 24.

A soap log is extruded having a slight amount of color smearing as compared to the logs in Example I. Variegated bars are stamped from portions of billets cut from the log. Bars are produced at a rate of about 65 lb./min.

Having described the instant invention to those of ordinary skill in the art, it can be seen that a wide variety of advantageously variegated soap bars can be made according to the above disclosure.

Accordingly, what is claimed is:

1. A process for making variegated soap bars, said process comprising:

a. providing at least two colored soap masses at a temperature and consistency suitable for plodding, there being soap masses of at least two different colors;

b. plodding and extruding the soap masses to form, i. at least one stream of small diameter noodles of one color, the small diameter noodles having diameters of about ⅛ inch or less, and ii. at least one stream of larger diameter noodles of a second color, the larger diameter noodles having diameters at least about twice as great as those of the small diameter noodles;

c. introducing the streams of the small and larger diameter noodles into a vacuum chamber at respective rates such that the weight rate of the small diameter noodles is from about 2 to about 6 times that of the larger diameter noodles;

d. directing together the streams of small and larger diameter noodles so as to achieve commingling of the noodles before they exit from the vaccum chamber;

e. introducing the commingled noodles into a final flodder;

f. plodding the commingled noodles in the final plodder into a variegated soap log; and g. forming the log into variegated soap bars.

2. A process according to claim 1 wherein the small diameter noodles are introduced into the vacuum chamber at a rate by weight of from about 3 to about 5 times the rate by weight at which larger diameter noodles are introduced into the vacuum chamber.

3. A process according to claim 1 wherein the small diameter noodles are extruded to lengths of from about 2 inches to about 5 inches and the larger diameter noodles are extruded to lengths of from about ¼ inch to about 5 inches.

4. A process according to claim 3 wherein the small diameter noodles are all of substantially equal lengths and the larger diameter noodles are all of substantially equal length.

5. A process according to claim 1 wherein the streams of smaller and larger diameter noodles are directed together into a substantially confluent stream of commingled noodles within the vacuum chamber.

6. A process according to claim 1 wherein the commingled noodles are introduced into the plodder by choke feeding.

7. A process according to claim 1 wherein the soap masses comprise from about 40% to about 90% by weight of tallow fatty acid soaps.

8. A process according to claim 1 wherein the formation of the soap log into variegated bars comprises the steps of:

a. cutting the variegated soap log into billets;

b. aligning each billet with a die box cavity;

c. forcing a portion of the aligned billet into the die box cavity to form a variegated bar within the cavity; and d. releasing the bar from the die box cavity.

9. A process according to claim 8 wherein each soap billet is aligned with a substantially rectangular die box cavity so as to have a longitudinal axis not coincident with the longitudinal axis of the die box cavity.

* * * * *